(12) United States Patent
Otagaki et al.

(10) Patent No.: US 10,323,973 B2
(45) Date of Patent: Jun. 18, 2019

(54) CAPACITIVE SENSOR FOR LIQUID SENSING

(71) Applicant: SEMICONDUCTOR COMPONENTS INDUSTRIES, LLC, Phoenix, AZ (US)

(72) Inventors: Takayasu Otagaki, Ota (JP); Kazuyoshi Ishikawa, Kumagaya (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 184 days.

(21) Appl. No.: 15/688,641

(22) Filed: Aug. 28, 2017

(65) Prior Publication Data

US 2019/0063981 A1 Feb. 28, 2019

(51) Int. Cl.
*G01F 23/26* (2006.01)

(52) U.S. Cl.
CPC .......... *G01F 23/268* (2013.01); *G01F 23/266* (2013.01)

(58) Field of Classification Search
CPC ..... G01F 23/263; G01F 23/266; G01F 23/268
See application file for complete search history.

(56) References Cited

U.S. PATENT DOCUMENTS

| 9,658,095 | B2 * | 5/2017 | Winkens | G01F 23/266 |
| 2005/0217369 | A1 * | 10/2005 | Holappa | G01F 23/0015 |
| | | | | 73/304 C |
| 2007/0236469 | A1 * | 10/2007 | Woolley | G01F 23/261 |
| | | | | 345/173 |
| 2012/0212725 | A1 | 8/2012 | Lafarre et al. | |
| 2013/0160530 | A1 | 6/2013 | Zuppiger | |
| 2014/0326066 | A1 * | 11/2014 | Mears | G01F 23/0069 |
| | | | | 73/304 C |
| 2016/0047683 | A1 * | 2/2016 | Winkens | G01F 23/266 |
| | | | | 73/304 C |
| 2016/0114590 | A1 | 4/2016 | Arpin | |
| 2018/0132643 | A1 * | 5/2018 | Shklar | G01F 23/0061 |

FOREIGN PATENT DOCUMENTS

| JP | 2007298400 A | 11/2007 |
| JP | 2009145248 A | 7/2009 |
| JP | 2010287579 A | 12/2010 |
| JP | 2013174457 A | 9/2013 |

* cited by examiner

*Primary Examiner* — Peter J Macchiarolo
*Assistant Examiner* — Nathaniel J Kolb
(74) *Attorney, Agent, or Firm* — Ramey & Schwaller, LLP (57) ABSTRACT

In accordance with at least one embodiment, a system for detecting a level is disclosed. The system includes a substrate having an input electrode and a drive electrode. The system further includes a container having an electrode. At least a portion of the electrode extends along a height dimension of the container. The container is arranged adjacent the substrate, such that the electrode is capacitively coupled to the input electrode or the drive electrode. The system further includes a circuit that, while the electrode is capacitively coupled to the input electrode or the drive electrode, determines a level of a substance inside the container, based on an effective capacitance between the input electrode and the drive electrode.

20 Claims, 10 Drawing Sheets

CAPACITIVE SENSOR FOR LIQUID SENSING

BACKGROUND

Embodiments of the present invention relate, in general, to electronics and, more particularly, to integrators and methods of forming semiconductor devices.

In the past, the semiconductor industry used various methods and sensors for detecting changes in physical attributes and generating a signal indicative of those changes. Sensors are useful in mechanical systems, chemical systems, and biological systems, among others. For example, in mechanical systems, sensors are useful in providing output information based on velocity, position, movement, temperature, altitude, etc.; in chemical systems, sensors are used to provide information about the chemical composition of their environment; and, in biological systems, sensors provide information about analytes present in a biological environment. In the electronics industry, touch sensors have been used as input device for electronic devices such as mobile phones, portable audio devices, portable game consoles, televisions, and personal computers. An example of a prior electrostatic capacity type of touch sensor was disclosed in U.S. Pat. No. 8,618,818, titled "Electrostatic Capacity Type Touch Sensor" by Takayasu Otagaki et al. and issued on Dec. 31, 2013. A drawback with sensors is that different sensors may vary in their level of sensitivity.

Accordingly, it would be advantageous to have a sensor and method of sensing or detecting physical attributes or changes in the physical attributes. It would be of further advantage for the structure and method to be cost effective to implement.

BRIEF DESCRIPTION OF THE DRAWINGS

Embodiments of the present invention will be better understood from a reading of the following detailed description, taken in conjunction with the accompanying drawing figures, in which like reference characters designate like elements and in which.

For simplicity and clarity of illustration, elements in the figures are not necessarily to scale, and the same reference characters in different figures denote the same elements. Additionally, descriptions and details of well-known steps and elements are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) are regarded as reasonable variances from the ideal goal of exactly as described.

DETAILED DESCRIPTION

In accordance with at least one embodiment, a system for detecting a level includes a substrate having an input electrode and a drive electrode. The system further includes a container having an electrode. At least a portion of the electrode extends along a height dimension of the container. The container is arranged adjacent the substrate, such that the electrode is capacitively coupled to the input electrode or the drive electrode. The system further includes a circuit that, while the electrode is capacitively coupled to the input electrode or the drive electrode, determines a level of a substance inside the container, based on an effective capacitance between the input electrode and the drive electrode.

In accordance with at least another embodiment, a method for detecting a level includes providing a container having an electrode. At least a portion of the electrode extends along a height dimension of the container. The method further includes providing a substrate having an input electrode and a drive electrode, and arranging at least the container or the substrate adjacent each other, to capacitively couple the electrode to the input electrode or the drive electrode. The method further includes, while the electrode is capacitively coupled to the input electrode or the drive electrode, determining a level of a substance inside the container, based on an effective capacitance between the input electrode and the drive electrode.

Each of the foregoing embodiments may be implemented in combination and/or may include one or more of the following features in any combination: (1) wherein the container and the substrate are separated by a dielectric; (2) wherein the dielectric includes a protective layer that covers the input electrode and the drive electrode, or air in a gap that separates the container and the substrate; (3) wherein the container is arranged adjacent the substrate, to capacitively couple the electrode to the input electrode; (4) wherein: the container further has a second electrode, at least a portion of the second electrode extending along the height dimension of the container; and the container is arranged adjacent the substrate, to capacitively couple the electrode to the input electrode, and capacitively couple the second electrode to the drive electrode; (5) wherein the substance inside the container includes a fluid, a gel, or a powder; (6) wherein the substrate includes a printed circuit board (PCB), a metal plate, a carbon plate, or an indium tin oxide (ITO) plate; (7) wherein the electrode is located inside the container; (8) wherein the at least a portion of the electrode extends along an interior surface of the container; (9) wherein the at least a portion of the electrode extends along an exterior surface of the container; (10) wherein the at least a portion of the electrode extends from a bottom of the container to at least near a top of the container; (11) wherein the container and the substrate are separated by a dielectric when the container and the substrate are arranged adjacent each other; (12) wherein the dielectric includes a protective layer that covers the input electrode and the drive electrode, or air in a gap that separates the container and the substrate; (13) wherein arranging at least the container or the substrate adjacent each other, capacitively couples the electrode to the input electrode; (14) wherein: the container further has a second electrode, at least a portion of the second electrode extending along the height dimension of the container; and arranging at least the container or the substrate adjacent each other, capacitively couples the electrode to the input electrode, and capacitively couples the second electrode to the drive electrode; (15) wherein: the at least a portion of the electrode extends from a bottom of the container to at least near a top of the container; and the at least a portion of the second electrode extends from the bottom of the container to at least near the top of the container; (16) wherein determining a level of the substance inside the container includes sensing the effective capacitance between the input electrode and the drive electrode; (17) wherein the substance inside the container includes a fluid, a gel, or a powder; (18) wherein the substrate includes a PCB, a metal plate, a carbon plate, or an ITO plate.

Figure 1:
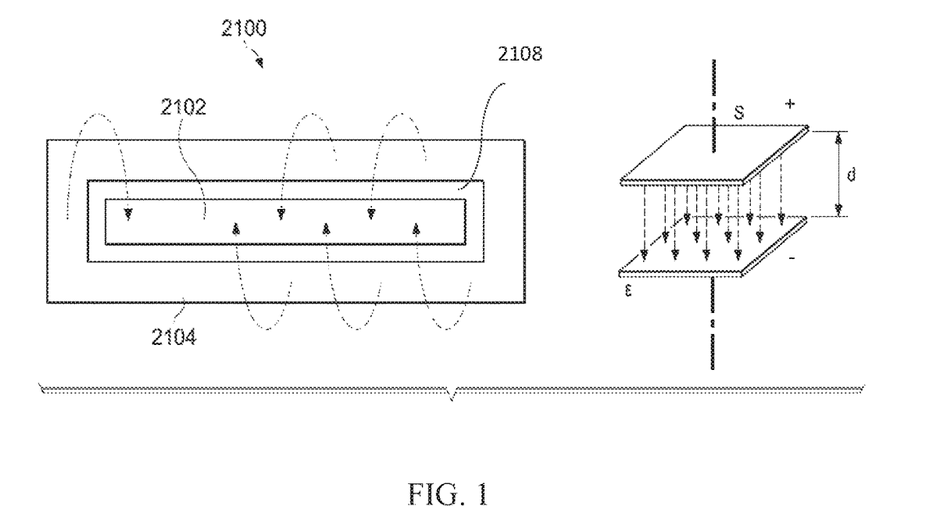
FIG. 1 illustrates a top view of an example of a sensing element.

FIG. 1 illustrates a top view of an example of a sensing element (or sensor) 2100. The sensing element 2100 includes an input pad 2102 and a drive pad 2104. The input pad 2102 and the drive pad 2104 are spaced apart from each other by a clearance 2108. For example, the input pad 2102 and the drive pad 2104 may be spaced apart from each other by a dielectric material or air in the clearance 2108.

The drive pad 2104 and input pad 2102 form a capacitor. When a voltage is applied between the drive pad 2104 and the input pad 2102, the capacitor becomes charged. One pad (e.g., the input pad 2102) acquires a negative charge, and the other pad (e.g., the drive pad 2104) acquires an equal amount of positive charge. Accordingly, an electric line of force (e.g., an electric field) is present between the two pads.

With continued reference to FIG. 1, the pads 2102, 2104 may be modeled as two plates. The capacitance C of the capacitor may be equal to $\varepsilon S/d$, where $\varepsilon$ denotes the permittivity in the spacing or separation (see, e.g., clearance 2108) between the two plates, S denotes the surface area of each plate, and d denotes the distance between the plates.

Figure 2A:
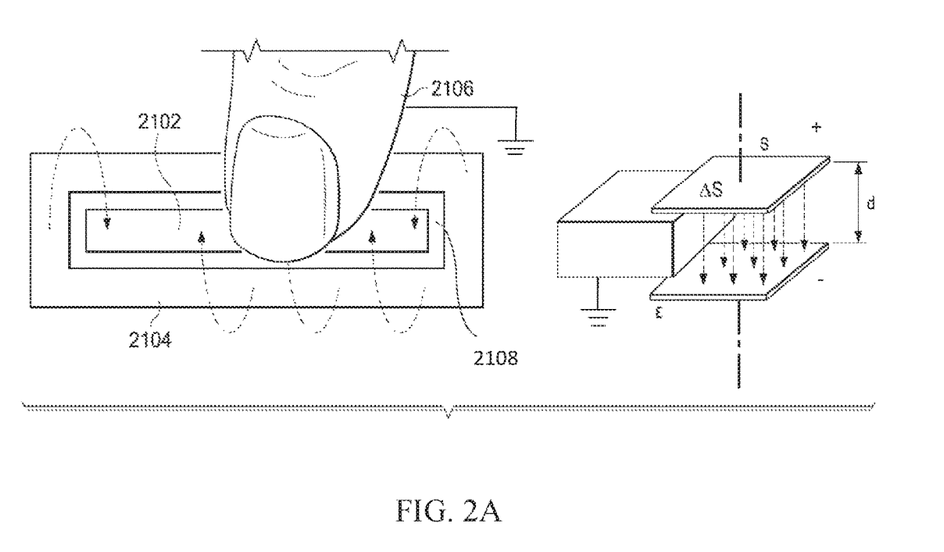
FIG. 2A illustrates a top view of a substance (e.g., conductive element coupled to ground) placed in the separation between an input pad and a drive pad.

FIG. 2A illustrates a top view of a substance (e.g., conductive element coupled to ground) placed in the separation between an input pad 2102 and a drive pad 2104. When the conductive element coupled to ground (e.g., finger 2106) is placed in this separation, electric charge flows less readily than in air. As the conductive element coupled to ground fills the separation, the capacitance C of the capacitor is decreased by an amount $\Delta C$. Therefore, the effective capacitance of the capacitor becomes $C-\Delta C$.

Figure 2B:
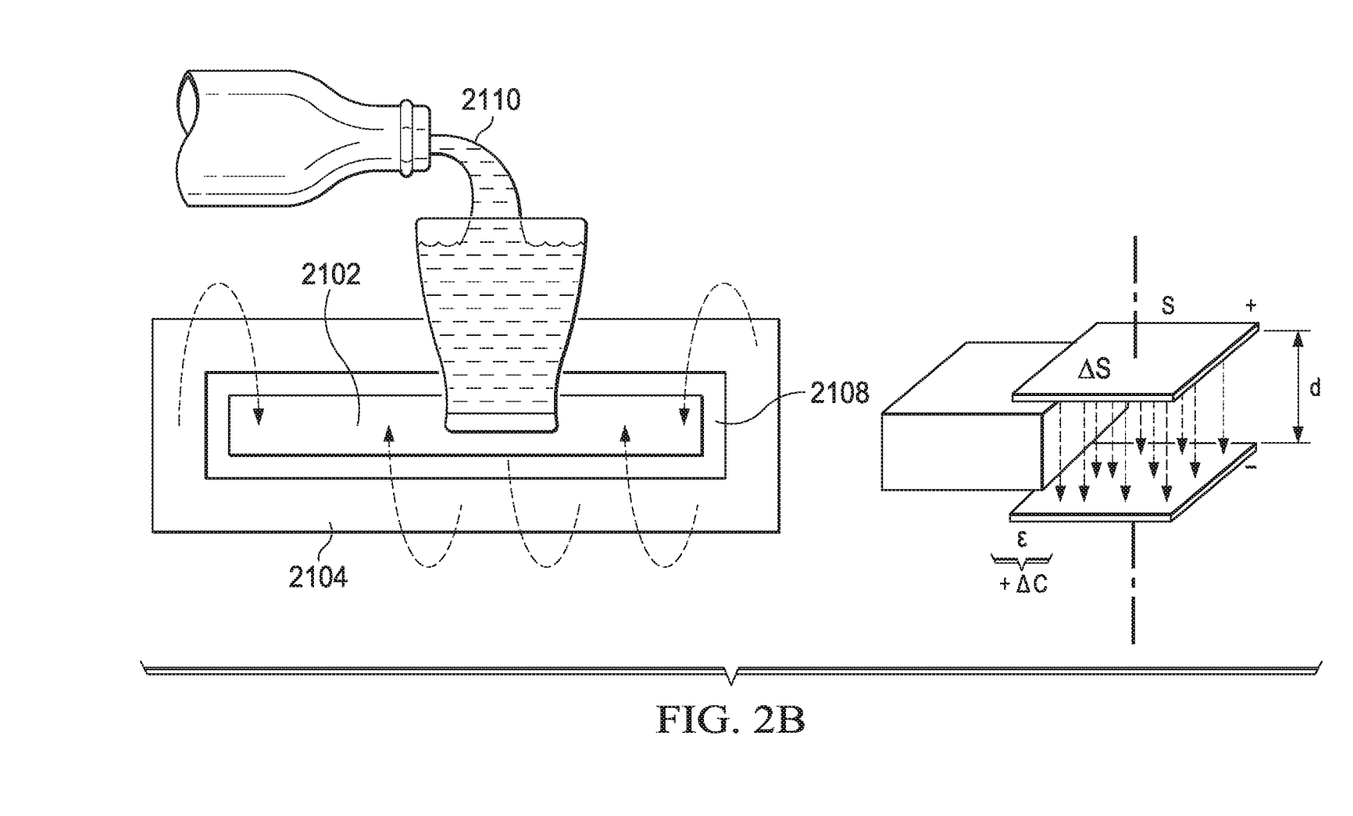
FIG. 2B illustrates a top view of a substance (e.g., dielectric) placed in the separation between an input pad and a drive pad.

As another example, FIG. 2B illustrates a top view of a substance (e.g., dielectric) placed in the separation between an input 2102 pad and a drive pad 2104. While air has a permittivity of around 1, water 2110 has a permittivity of around 80. Therefore, when a dielectric such as water 2110 (rather than air) fills the separation between the input pad 2102 and the drive pad 2104, the value of C, as calculated using the equation $C=\varepsilon S/d$, increases.

Figure 3A:
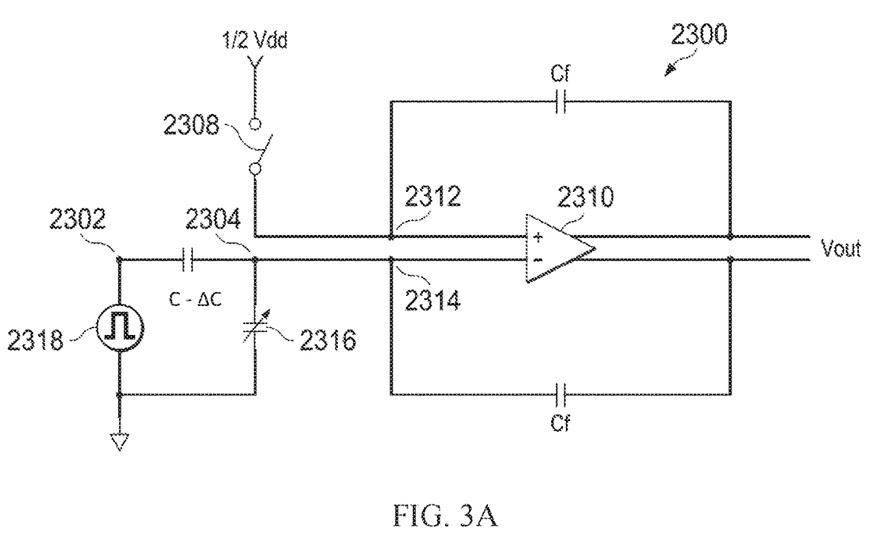
FIGS. 3A and 3B illustrate diagrams of an example circuit that represents a device.
Figure 3B:
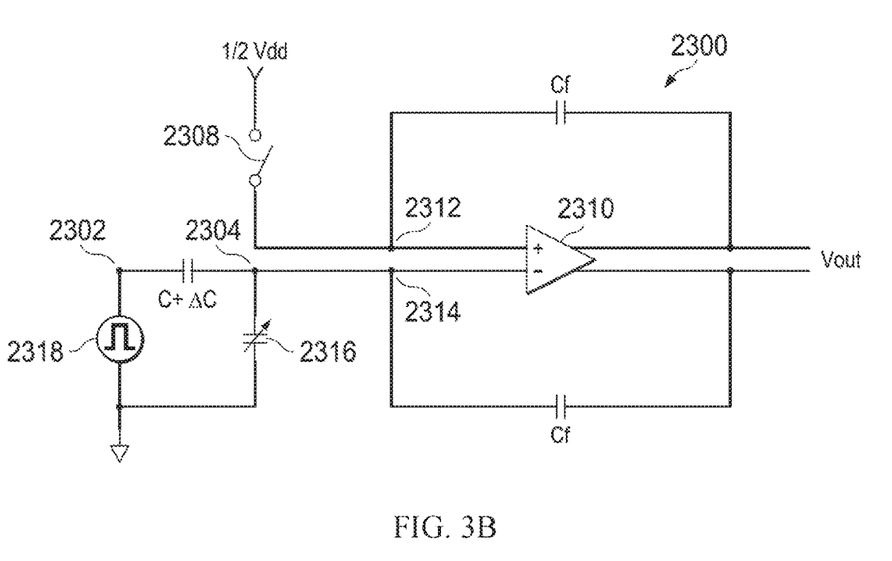

FIGS. 3A and 3B illustrate diagrams of an example circuit that represents a device 2300. The device 2300 includes the sensor 2100. The device 2300 may be an integrated circuit (IC). Node 2302 represents the drive pad 2104 of the sensor 2100. Node 2304 represents the input pad 2102 of the sensor 2100. The device 2300 also includes a switch 2308 and a differential amplifier 2310. The differential amplifier 2310 has input terminals 2312 and 2314. The device 2300 also includes a corrective capacitor (variable capacitor) 2316. In operation, the capacitance of the corrective capacitor 2316 adjusts according to the capacitance of the sensor 2100. For example, the capacitance of the corrective capacitor 2316 adjusts to be equal to the capacitance of the sensor 2100.

The sensor 2100 may be calibrated at each of one or more instances. During each calibration, the output of the differential amplifier 2310 is monitored. As will be described in more detail below, the capacitance of the corrective capacitor 2316 is noted when the output of the differential amplifier 2310 becomes logic low (e.g., 0V).

Calibration at the device 2300 will now be described with reference with a situation in which there is a lack of material adjacent to the separation between the input pad 2102 and the drive pad 2104 (e.g., the finger 2106 or the water 2110 is not located at the clearance 2108).

A pulse 2318 of amplitude Vdd is applied between the drive pad 2104 and a return for the pulse (e.g., GND). The capacitor formed by the drive pad 2104 and the input pad 2102 has a capacitance of C. During calibration, the capacitance of the corrective capacitor 2316 adjusts to be equal to the capacitance of the sensor 2100. When the two capacitance values are equal to each other, the voltage between the drive pad 2104 and the input pad 2102 becomes equal to the voltage across the corrective capacitor 2316. For example, when the pulse 2318 applies Vdd between the drive pad 2104 and the return, both the voltage between the drive pad 2104 and the input pad 2102 and the voltage across the corrective capacitor 2316 become equal to Vdd/2.

In the above situation, the input at the input terminal 2314 of the differential amplifier 2310 becomes equal to Vdd/2. When the switch 2308 is closed, the input at the input terminal 2312 of the differential amplifier 2310 is also equal to Vdd/2. Accordingly, the inputs to the differential amplifier 2310 are equal to each other. Therefore, the output of the differential amplifier 2310 becomes logic low. This indicates that the capacitance of the corrective capacitor 2316 has adjusted to be equal to the capacitance of the sensor 2100. Accordingly, the capacitance of the corrective capacitor 2316 (C) is noted.

Calibration at the device 2300 will now be described with reference with a situation in which there is a presence of material adjacent to the separation between the input pad 2102 and the drive pad 2104 (e.g., the finger 2106 or the water 2110 is located at the clearance 2108).

With reference to FIG. 3A, a pulse of amplitude Vdd is applied between the drive pad 2104 and a return for the pulse (e.g., GND). The capacitor formed by the drive pad 2104 and the input pad 2102 has a capacitance of $C-\Delta C$. The decrease $\Delta C$ is due to the decrease of the electric field because the finger 2106 is coupled to ground. During calibration, the capacitance of the corrective capacitor 2316 adjusts to be equal to the capacitance of the sensor 2100. When the two capacitance values are equal to each other, the voltage between the drive pad 2104 and the input pad 2102 becomes equal to the voltage across the corrective capacitor 2316. For example, when the pulse 2318 applies Vdd between the drive pad 2104 and the return, both the voltage between the drive pad 2104 and the input pad 2102 and the voltage across the corrective capacitor 2316 become equal to Vdd/2.

In the situation of FIG. 3A, the input at the input terminal 2314 of the differential amplifier 2310 becomes equal to Vdd/2. When the switch 2308 is closed, the input at the input terminal 2312 of the differential amplifier 2310 is also equal to Vdd/2. Accordingly, the inputs to the differential amplifier 2310 are equal to each other. Therefore, the output of the differential amplifier 2310 is logic low. This indicates that the capacitance of the corrective capacitor 2316 has adjusted to be equal to the capacitance of the sensor 2100. Accordingly, the capacitance of the corrective capacitor 2316 (C−ΔC) is noted.

With reference to FIG. 3B, a pulse of amplitude Vdd is applied between the drive pad 2104 and a return for the pulse. The capacitor formed by the drive pad 2104 and the input pad 2102 has a capacitance of C+ΔC. The increase ΔC is due to the greater permittivity of the fluid (e.g., water 2110) relative to that of air. During calibration, the capacitance of the corrective capacitor 2316 adjusts to be equal to the capacitance of the sensor 2100. When the two capacitance values are equal to each other, the voltage between the drive pad 2104 and the input pad 2102 becomes equal to the voltage across the corrective capacitor 2316. For example, when the pulse 2318 applies Vdd between the drive pad 2104 and the return, both the voltage between the drive pad 2104 and the input pad 2102 and the voltage across the corrective capacitor 2316 become equal to Vdd/2.

In the situation of FIG. 3B, the input at the input terminal 2314 of the differential amplifier 2310 becomes equal to Vdd/2. When the switch 2308 is closed, the input at the input terminal 2312 of the differential amplifier 2310 is also equal to Vdd/2. Accordingly, the inputs to the differential amplifier 2310 are equal to each other. Therefore, the output of the differential amplifier 2310 is logic low. This indicates that the capacitance of the corrective capacitor 2316 has adjusted to be equal to the capacitance of the sensor 2100. Accordingly, the capacitance of the corrective capacitor 2316 (C+ΔC) is noted.

An initial measurement at the device 2300 may be performed at a particular time (e.g., when the device is placed in a container for containing liquid, and the container is empty). The capacitance of the corrective capacitor 2316 (e.g., C) is noted at this time. This value may be stored as a reference value.

During each of subsequent calibrations, the capacitance of the corrective capacitor 2316 is noted and is compared against the reference value. If there is little or no difference between the capacitance of the corrective capacitor 2316 and the reference value, then it may be determined that there is a lack of fluid adjacent to the separation between the input pad 2102 and the drive pad 2104 (e.g., the sensor 2100). Accordingly, it may be determined that the fluid surface is not at the level of the sensor 2100. If there is a larger difference between the capacitance of the corrective capacitor 2316 and the reference value, then it may be determined that there is a presence of fluid adjacent to the separation between the input pad 2102 and the drive pad 2104 (e.g., the sensor 2100). Accordingly, it may be determined that the fluid surface is at the level of the sensor 2100.

Aspects of the present disclosure are directed to detecting the level of a substance (e.g., a fluid) inside a container. Various embodiments are directed to improving the accuracy of the detection. Accordingly, values that can be detected span a wider range of values of a greater resolution (e.g., values of a linear function). As will be described in more detail with reference to various embodiments, the number of direct connections (e.g., wired connections) that are required is reduced, in order to reduce complexity. For example, capacitive couplings are utilized. As will also be described with reference various embodiments, a substrate for detecting a fluid level may be located at various orientations with respect to the container. For example, the substrate may be positioned opposite a bottom side of the container, opposite a top side of the container, or opposite a side of the container that is neither the top side nor the bottom side of the container.

Figure 4A:
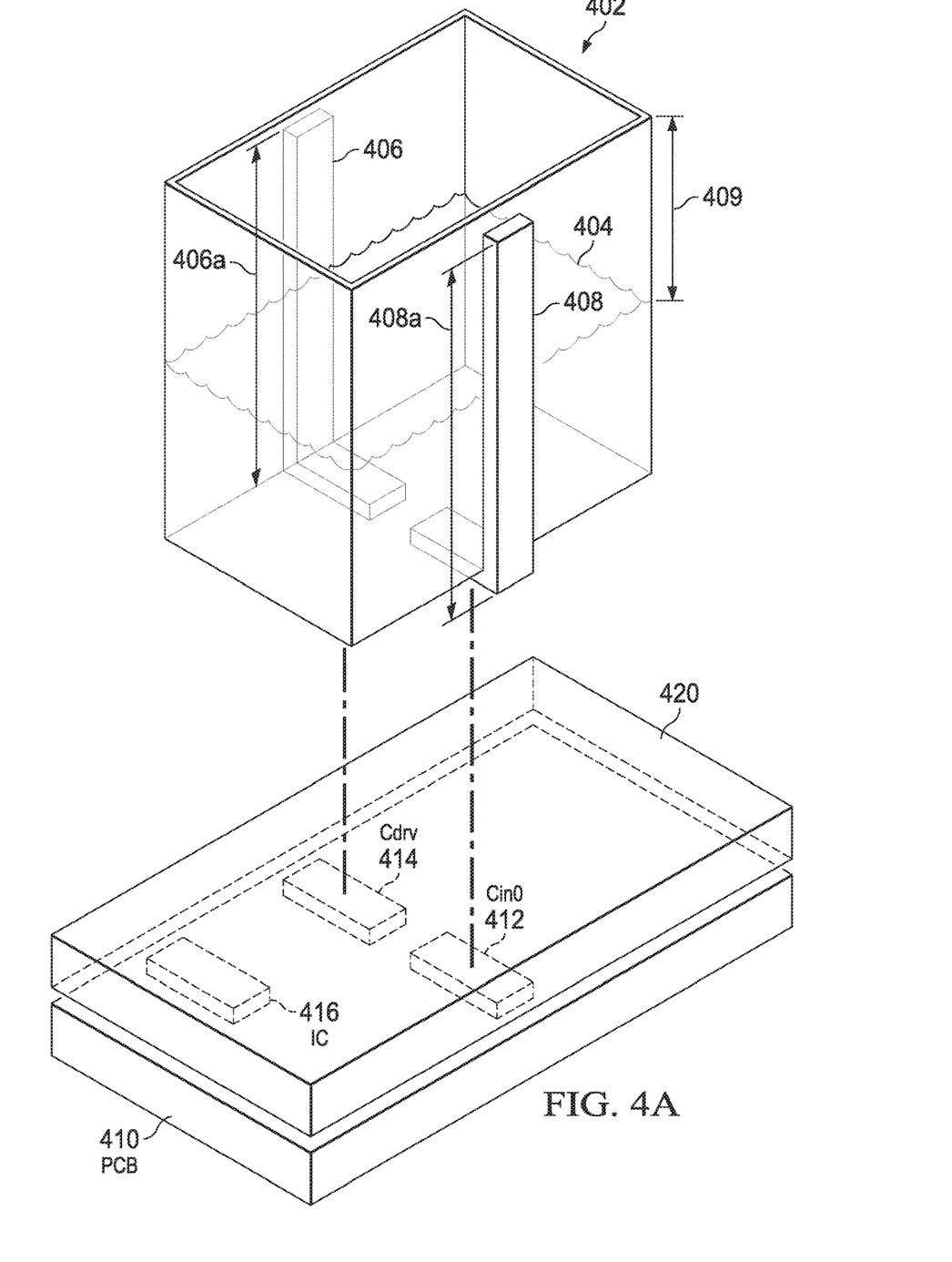
FIGS. 4A and 4B show an example of capacitive coupling according to at least one embodiment.
Figure 4B:
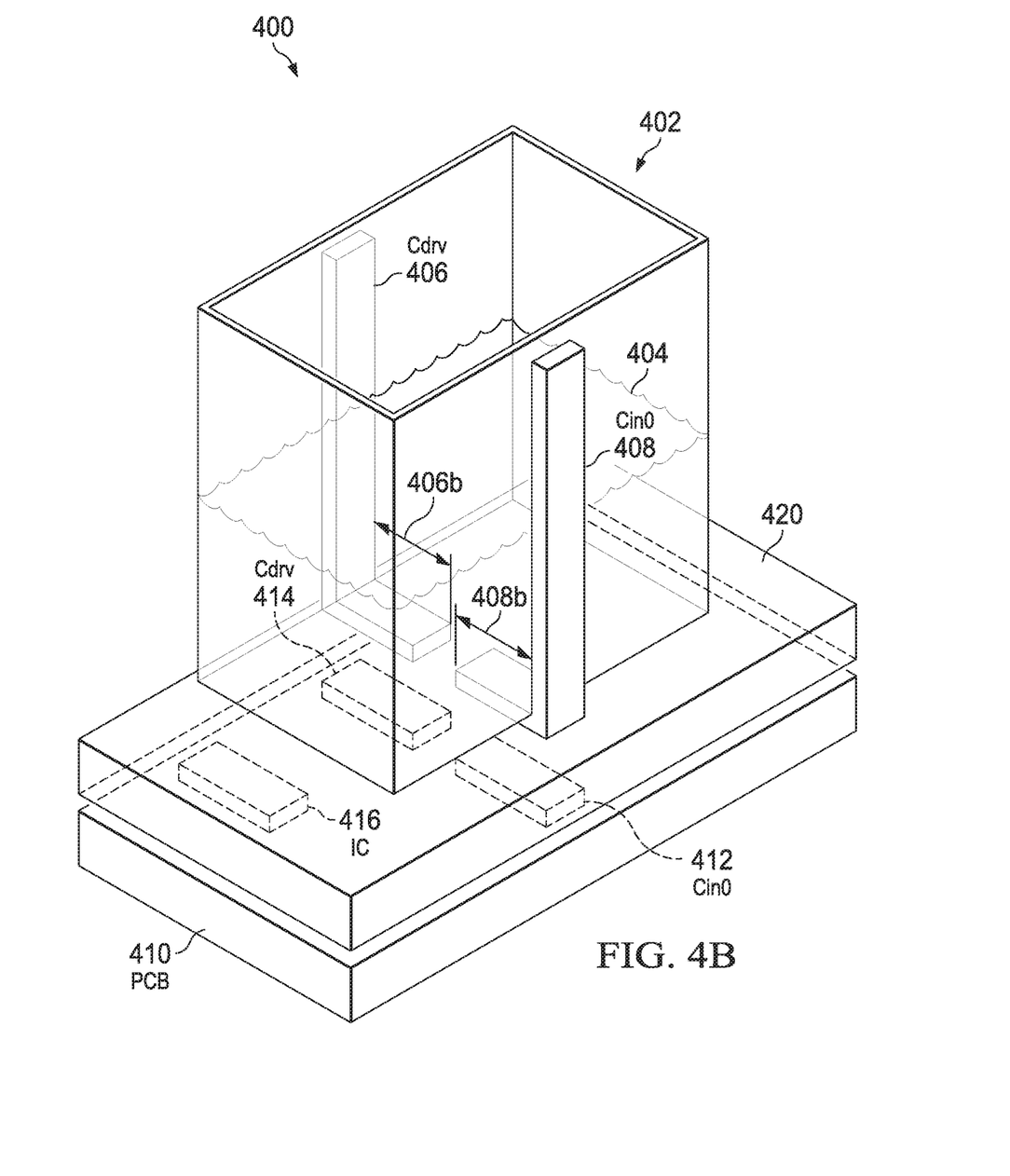

FIGS. 4A and 4B show an example of capacitive coupling according to at least one embodiment. With reference to FIG. 4A, a container 402 is provided. As illustrated, the container 402 has the shape of a box. However, it is understood that the container 402 may have other types of shapes. The container 402 is for holding a substance 404. As illustrated in FIG. 4A, the substance 404 is a fluid. However, it is understood that the substance 404 may include a liquid and/or other types of substances (e.g., a gel, a powder, etc.). Volume 409 of the container 402 is devoid of the substance 404. In embodiments described herein, it is assumed that the volume 409 contains air.

In at least one embodiment, the container 402 has a first electrode 406 and a second electrode 408. At least a portion of each electrode 406, 408 extends along a height dimension of the container 402. For example, portion 406a of electrode 406 extends along the height dimension of the container 402. More particularly, portion 406a may extend from the bottom of the container 402 to at least near the top of the container. Similarly, portion 408a of electrode 408 extends along the height dimension of the container 402. More particularly, portion 408a may extend from the bottom of the container 402 to at least near the top of the container.

As illustrated in FIG. 4A, the electrodes 406 and 408 are located outside of the container 402. Accordingly, portion 406a of electrode 406 extends along an exterior surface of the container 402. Similarly, portion 408a of electrode 408 extends along another exterior surface of the container 402.

However, it is understood that the electrodes 406 and 408 need not be located outside of the container 402. For example, the electrodes 406 and 408 may be located inside the container 402. In this situation, portion 406a and portion 408a may extend along interior surfaces of the container 402.

A substrate 410 is also illustrated in FIG. 4A. In at least one embodiment, the substrate 410 is formed from a printed circuit board (PCB). Alternatively, in at least one embodiment, the substrate 410 is formed from a PCB and/or one or more other layer(s) such as a metal plate, a carbon plate, an indium tin oxide (ITO) plate, etc.

An input electrode 412 and a drive electrode 414 are located on the substrate 410. The input electrode 412 serves a function that is similar to that of input pad 2102, which was described earlier with reference to FIGS. 1, 2A, 2B, 3A and 3B. The drive electrode 414 serves a function that is similar to that of drive pad 2104, which was described earlier also with reference to FIGS. 1, 2A, 2B, 3A and 3B.

An IC 416 is also located on the substrate 410. The IC 416 may include circuitry similar to circuitry described earlier with reference to device 2300 of FIGS. 3A and 3B.

In at least one embodiment, a layer 420 is provided. As illustrated in FIG. 4A, the layer 420 covers the input electrode 412 and the drive electrode 414. The layer 420 may serve as a protective layer. For example, the layer 420 serves as a barrier that keeps substances (e.g., substance 404) from coming into contact with the input electrode 412 and the drive electrode 414. In at least one embodiment, the layer 420 is formed of plastic, acrylic glass, and/or another type(s) of non-conductive material having a sufficiently high linear permittivity.

Alternatively, a gap is located between the container 402 and the substrate 410 in lieu of (or in addition to) the layer 420. In this situation, air in the gap serves as a dielectric material.

Regarding system 400 of FIG. 4B, the container 402 and the substrate 410 are arranged to be adjacent each other. If the layer 420 is provided, then the layer 420 becomes located between the container 402 and the substrate 410. In other words, the layer 420 separates the container 402 and the substrate 410 from each other when the container and the substrate are arranged adjacent each other.

More particularly, the container 402 and the substrate 410 are arranged in a manner such that portion 408b (of electrode 408) is positioned opposite the input electrode 412. During operation, this arrangement capacitively couples the electrode 408 to the input electrode 412. In this manner, for purposes of sensing, the electrode 408 serves as an "extension" of the input electrode 412, that extends along the height of the container 402. Concurrently, the arrangement of the container 402 and the substrate 410 positions portion 406b (of electrode 406) opposite the drive electrode 414. During operation, this arrangement capacitively couples the electrode 406 to the drive electrode 414. In this manner, for purposes of sensing, the electrode 406 serves as an "extension" of the drive electrode 414, that extends along the height of the container 402.

In embodiments where the layer 420 is present, the layer is sufficiently thin to facilitate the capacitive coupling of the electrode 408 and the input electrode 412 and the capacitive coupling of the electrode 406 and the drive electrode 414.

The capacitive coupling between the electrode 408 and the input electrode 412 does not require a direct connection (e.g., wired connection). Similarly, the capacitive coupling between the electrode 406 and the drive electrode 414 does not require a direct connection. Not requiring such wire connections reduces the number of direct connections in the system 400 and, therefore, reduces complexity. For example, the container 402 and the substrate 410 may be more readily moved toward or away from each other to couple or decouple electrodes.

The level of the substance 404 in the container 402 may be determined, based on an effective capacitance between the drive electrode 414 and the input electrode 412. The effective capacitance will be described in more detail with reference to the representative circuit models of FIGS. 5A and 5B.

Figure 5A:
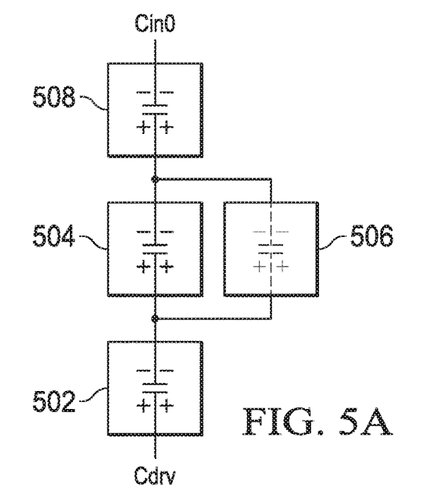
FIGS. 5A and 5B are representative circuit models of the system of FIG. 4B.
Figure 5B:
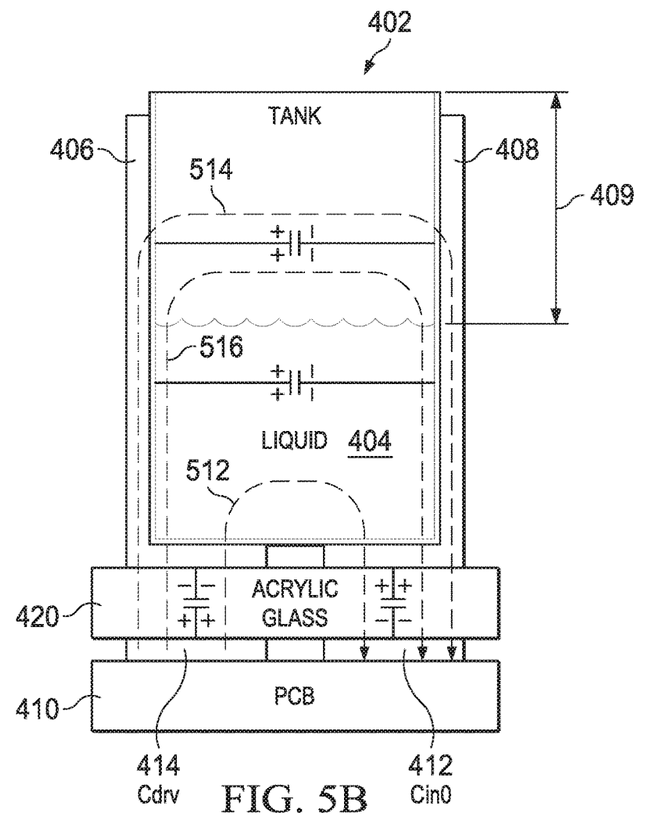

FIGS. 5A and 5B illustrate circuit models of the system 400 of FIG. 4B. The effective capacitance between the drive electrode 414 and the input electrode 412 may be modeled as a connection of four capacitors: capacitors 502, 504, 506, and 508. Each of the capacitors 502, 504, 506, and 508 corresponds to a respective dielectric material that is located between the drive electrode 414 and the input electrode 412, and/or between respective "extensions" of the electrodes 414 and 412. As will be described in more detail below, capacitors 502 and 508 correspond to the layer 420, the capacitor 504 corresponds to the substance 404, and the capacitor 506 corresponds to a substance present in the volume 409 (e.g., air).

As illustrated in FIG. 5A, the capacitor 502 is connected in series with a parallel connection of the capacitors 504 and 506, which, in turn, is connected in series with the capacitor 508. The illustrated connections of the capacitors 502, 504, 506 and 508 model the effective capacitance (e.g., total capacitance) between the drive electrode 414 and the input electrode 412.

FIG. 5B illustrates electric field lines that pass from the drive electrode 414 to the input electrode 412. As described earlier with reference to FIG. 4B, the drive electrode 414 is capacitively coupled to the electrode 406, and the input electrode 412 is capacitively coupled to the electrode 408. In this manner, the electrodes 406 and 408 may be considered as "extensions" of the drive electrode 414 and the input electrode 412, respectively. Therefore, it is considered that electric field lines that pass from the drive electrode 414 to the input electrode 412 include electric field lines that pass from the electrode 406 to the electrode 408.

The electric field lines that pass from the drive electrode 414 to the input electrode 412 include: electric field lines that pass through the substance 404 (e.g., electric field line 512); electric field lines that pass through the volume 409 (e.g., electric field line 514); and electric field lines that pass through both the substance 404 and the volume 409 (e.g., electric field line 516).

Figure 6:
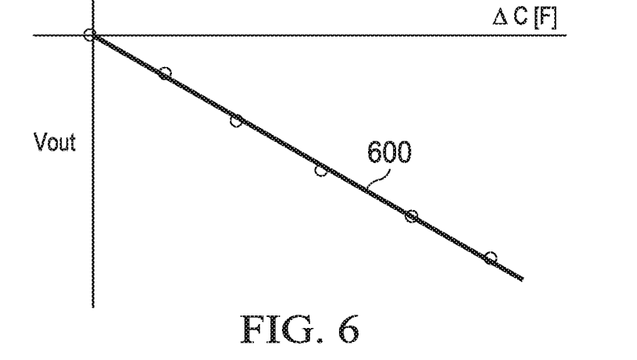
FIG. 6 illustrates a relationship between values of the measured voltage and changes in the effective capacitance.

As described earlier, the level of the substance 404 in the container 402 may be determined, based on an effective capacitance between the drive electrode 414 and the input electrode 412. According to at least one embodiment, the change in the effective capacitance is based, in turn, on a measured voltage (e.g., Vout of FIGS. 3A and 3B). FIG. 6 illustrates a relationship 600 between values of the measured voltage and changes in the effective capacitance. As illustrated in FIG. 6, the relationship 600 is generally linear.

In embodiment(s) that have been described with reference to FIG. 4B, both the input electrode 412 and the drive electrode 414 are capacitively coupled to respective electrodes (e.g., electrodes 408 and 406). In other embodiment(s), only the input electrode 412 is capacitively coupled to a corresponding electrode, or only the drive electrode 414 is capacitively coupled to a corresponding electrode. Such a configuration may be used when a relatively lower degree of accuracy (with respect to the detected liquid level) is acceptable.

For example—according to at least one embodiment, only the input electrode 412 is capacitively coupled to a corresponding electrode (e.g., electrode 408 of FIG. 4B). In this situation, the electrode 406 is not present, and the drive electrode 414 is not capacitively coupled to an electrode that extends along the height of the container 402. Electric field lines that pass from the drive electrode 414 to the input electrode 412 include electric field lines that pass from the drive electrode 414 to the electrode 408.

According to at least another embodiment, only the drive electrode 414 is capacitively coupled to a corresponding electrode (e.g., electrode 406 of FIG. 4B). In this situation, the electrode 408 is not present, and the input electrode 412 is not capacitively coupled to an electrode that extends along the height of the container 402. Electric field lines that pass from the drive electrode 414 to the input electrode 412 include electric field lines that pass from the electrode 406 to the input electrode 412.

In embodiment(s) that have been described with reference to FIG. 4B, the substrate 410 is positioned underneath the container 402. According to other embodiments, a substrate is arranged elsewhere relative to a container.

Figure 7:
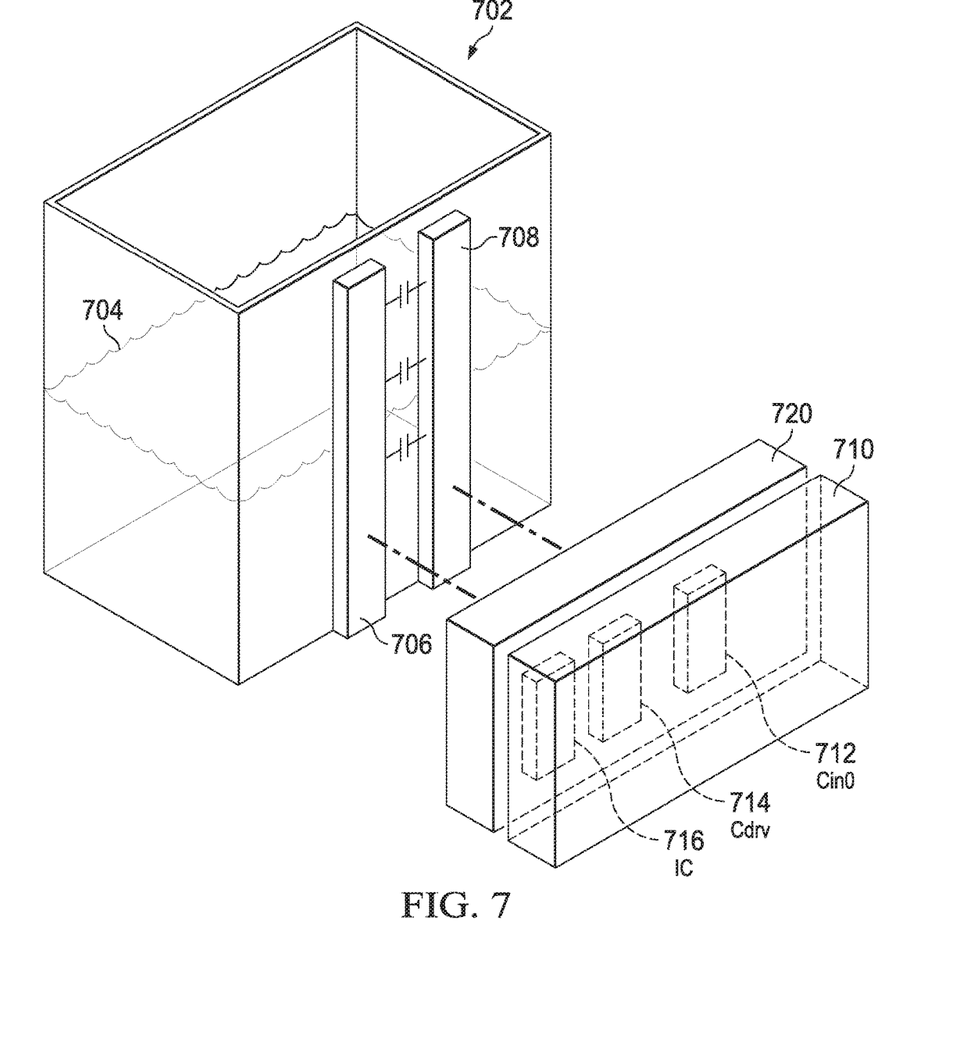
FIG. 7 shows an example of capacitive coupling according to at least one embodiment.

FIG. 7 shows an example of capacitive coupling according to at least one embodiment. Electrodes 706 and 708 are located outside of a container 702. For example, electrodes 706 and 708 extend along a same exterior surface of the container 702.

It is understood that the electrodes 706 and 708 need not be located outside of the container 702. For example, the electrodes 706 and 708 may be located inside the container 702. In this situation, the electrodes 706 and 708 may extend along a same interior surface of the container 702.

A substrate 710 is arranged opposite the surface of the container 702 at which the electrodes 706 and 708 are located. As such, the substrate 710 is positioned opposite a side of the container 702 that is not the top or the bottom of the container.

More particularly, the container 702 and the substrate 710 are arranged in a manner such that the electrode 708 is positioned opposite the input electrode 712. During operation, this arrangement capacitively couples the electrode 708 to the input electrode 712. In this manner, for purposes of sensing, the electrode 708 serves as an "extension" of the input electrode 712, that extends along the height of the container 702. Concurrently, the arrangement of the container 702 and the substrate 710 positions the electrode 706 opposite the drive electrode 714. During operation, this arrangement capacitively couples the electrode 706 to the drive electrode 714. In this manner, for purposes of sensing, the electrode 706 serves as an "extension" of the drive electrode 714, that extends along the height of the container 702.

An IC 716 is also located on the substrate 710. The IC 716 may include circuitry similar to circuitry described earlier with reference to device 2300 of FIGS. 3A and 3B.

In at least one embodiment, a layer 720 is provided. As illustrated in FIG. 7, the layer 720 covers the input electrode 712 and the drive electrode 714. The layer 720 may serve as a protective layer. For example, the layer 720 serves as a barrier that keeps substances (e.g., substance 704) from coming into contact with the input electrode 712 and the drive electrode 714. In at least one embodiment, the layer 720 is formed of plastic, acrylic glass, and/or another type(s) of non-conductive material having a sufficiently high linear permittivity.

Alternatively, a gap is located between the container 702 and the substrate 710 in lieu of (or in addition to) the layer 720. In this situation, air in the gap serves as a dielectric material.

Similar to embodiment(s) described earlier with reference to FIG. 4B, the level of a substance 704 in the container 702 may be determined, based on an effective capacitance between the drive electrode 714 and the input electrode 712.

In embodiment(s) that have been described with reference to FIG. 7, both the input electrode 712 and the drive electrode 714 are capacitively coupled to respective electrodes (e.g., electrodes 708 and 706). In other embodiment(s), only the input electrode 712 is capacitively coupled to a corresponding electrode, or only the drive electrode 714 is capacitively coupled to a corresponding electrode. As described earlier, such a configuration may be used when a relatively lower degree of accuracy (with respect to the detected liquid level) is acceptable.

Figure 8A:
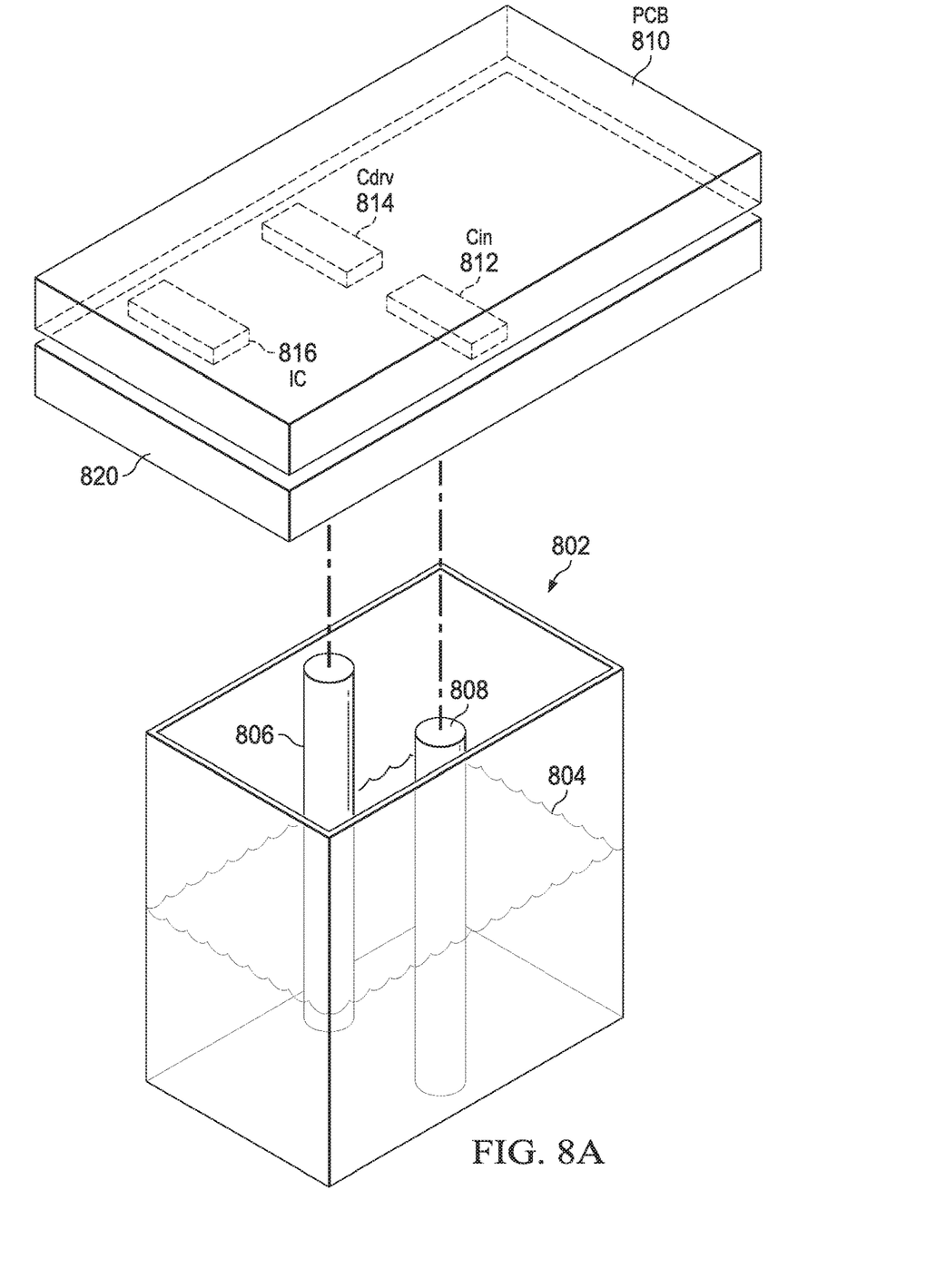
FIGS. 8A and 8B show an example of capacitive coupling according to at least one embodiment.
Figure 8B:
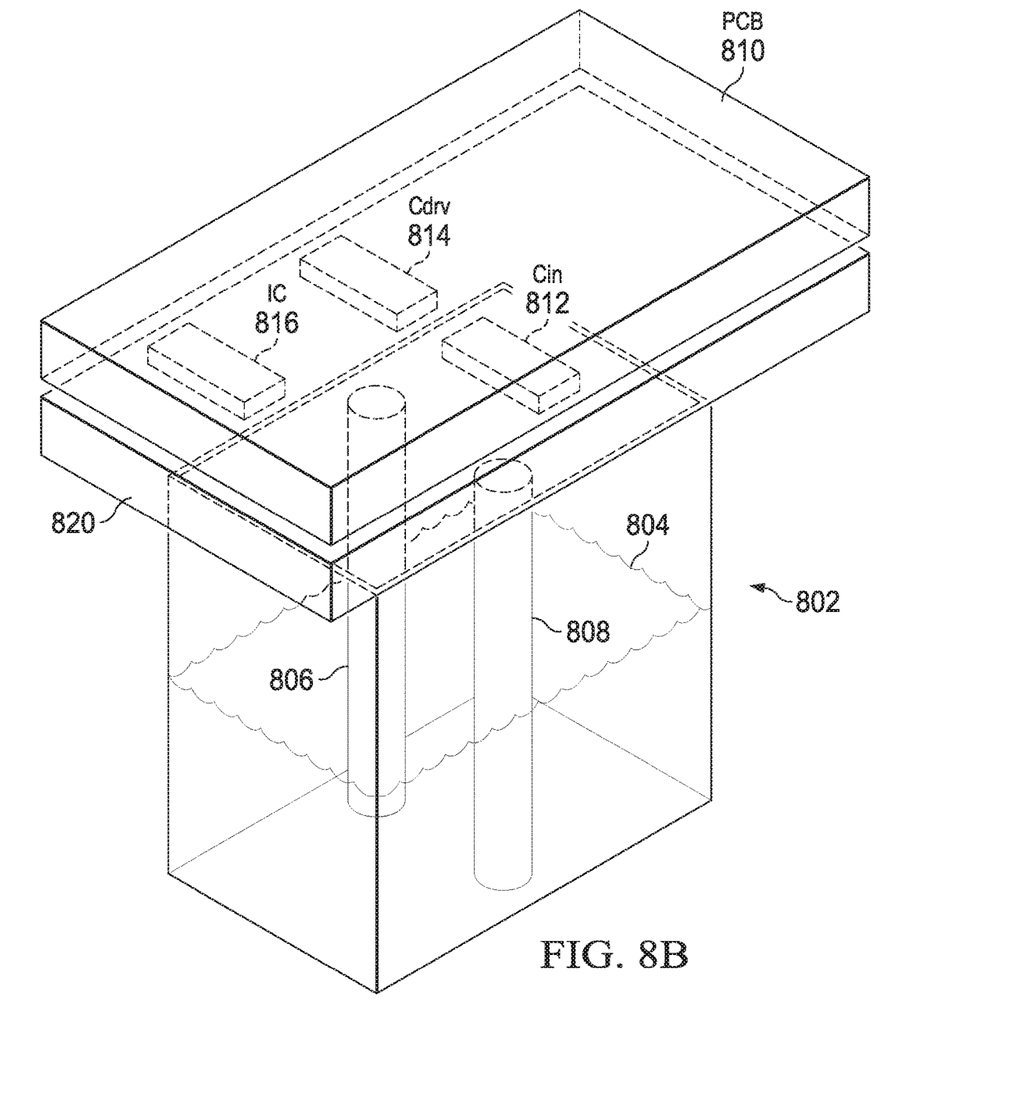

FIGS. 8A and 8B show an example of capacitive coupling according to at least one embodiment. With reference to FIG. 8A, electrodes 806 and 808 are located inside a container 802. The electrodes 806 and 808 extend along the height dimension of the container 802. The electrode 806 extends from the bottom of the container 802 to at least near the top of the container. Similarly, the electrode 808 extends from the bottom of the container 802 to at least near the top of the container. In at least one other embodiment, the electrodes 806 and 808 extend along opposite interior surfaces of the container 802.

With reference to FIGS. 8A and 8B, a substrate 810 is arranged above the container 802. For example, the substrate 810 is arranged opposite the top of the container 802.

More particularly, the container 802 and the substrate 810 are arranged in a manner such that the electrode 808 is positioned opposite the input electrode 812. During operation, this arrangement capacitively couples the electrode 808 to the input electrode 812. In this manner, for purposes of sensing, the electrode 808 serves as an "extension" of the input electrode 812, that extends along the height of the container 802. Concurrently, the arrangement of the container 802 and the substrate 810 positions the electrode 806 opposite the drive electrode 814. During operation, this arrangement capacitively couples the electrode 806 to the drive electrode 814. In this manner, for purposes of sensing, the electrode 806 serves as an "extension" of the drive electrode 814, that extends along the height of the container 802.

An IC 816 is also located on the substrate 810. The IC 816 may include circuitry similar to circuitry described earlier with reference to device 2300 of FIGS. 3A and 3B.

In at least one embodiment, a layer 820 is provided. As illustrated in FIG. 8A, the layer 820 covers the input electrode 812 and the drive electrode 814. The layer 820 may serve as a protective layer. For example, the layer 820 serves as a barrier that keeps substances (e.g., substance 804) from coming into contact with the input electrode 812 and the drive electrode 814. In at least one embodiment, the layer 820 is formed of plastic, acrylic glass, and/or another type(s) of non-conductive material having a sufficiently high linear permittivity.

Alternatively, a gap is located between the container 802 and the substrate 810 in lieu of (or in addition to) the layer 820. In this situation, air in the gap serves as a dielectric material.

Similar to embodiment(s) described earlier with reference to FIG. 4B, the level of a substance 804 in the container 802 may be determined, based on an effective capacitance between the drive electrode 814 and the input electrode 812.

In embodiment(s) that have been described with reference to FIG. 8B, both the input electrode 812 and the drive electrode 814 are capacitively coupled to respective electrodes (e.g., electrodes 808 and 806). In other embodiment(s), only the input electrode 812 is capacitively coupled to a corresponding electrode, or only the drive electrode 814 is capacitively coupled to a corresponding electrode. As described earlier, such a configuration may be used when a relatively lower degree of accuracy (with respect to the detected liquid level) is acceptable.

Figure 9:
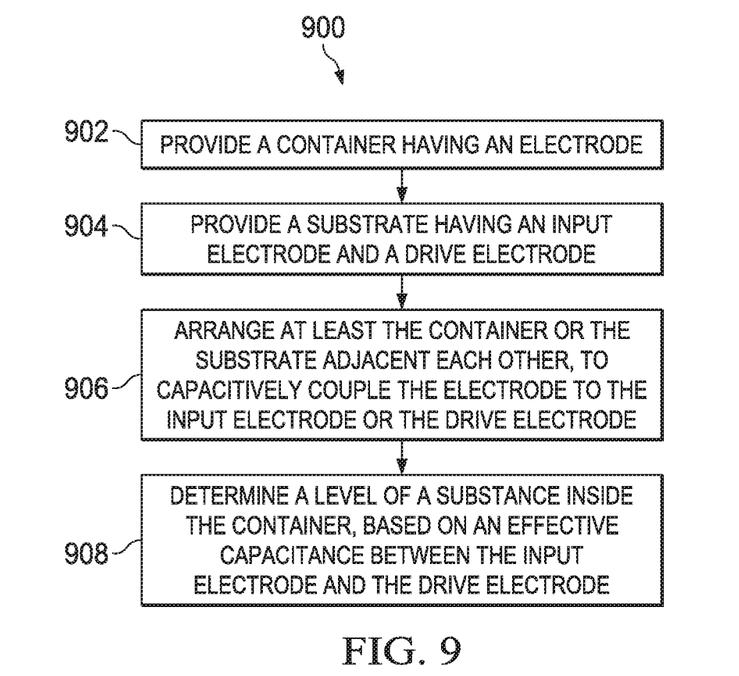
FIG. 9 is a flowchart of a method of detecting a level according to at least one embodiment.

FIG. 9 is a flowchart 900 of a method of detecting a level according to at least one embodiment.

At box 902, a container having an electrode (e.g., container 402 having electrode 408 and/or electrode 406) is provided. At least a portion of the electrode extends along a height dimension of the container.

At box 904, a substrate having an input electrode and a drive electrode (e.g., substrate 410 having an input electrode 412 and a drive electrode 414) is provided.

At box 906, at least the container or the substrate is arranged adjacent each other, to capacitively couple the electrode to the input electrode or the drive electrode. For example, with reference to FIG. 4B, at least the container 402 or the substrate 410 is arranged adjacent each other, to capacitively couple the electrode 408 or the electrode 406 to the input electrode 412 or the drive electrode 414.

According to at least one particular embodiment, the arrangement capacitively couples the electrode to the input electrode. For example, the arrangement of at least the container 402 or the substrate 410 capacitively couples the electrode 408 to the input electrode 412.

According to at least one particular embodiment, the arrangement capacitively couples the electrode to the input electrode, and capacitively couples the second electrode to the drive electrode. For example, the arrangement of at least the container 402 or the substrate 410 capacitively couples the electrode 408 to the input electrode 412, and capacitively couples the electrode 406 to the drive electrode 414.

At box 908—while the electrode is capacitively coupled to the input electrode or the drive electrode, a level of a substance inside the container is determined, based on an effective capacitance between the input electrode and the drive electrode. For example, a level of the substance 404 inside the container 402 is determined, based on an effective capacitance between the input electrode 412 and the drive electrode 414.

According to at least one particular embodiment, determining the level of the substance inside the container includes sensing the effective capacitance between the input electrode and the drive electrode. For example, the effective capacitance may be sensed based on a measured voltage (e.g., Vout of FIGS. 3A and 3B).

Various embodiments have been described with reference to detecting the level of a substance (e.g., a fluid) inside a container. It is understood that the detection may occur in various contexts. For example, the detection may occur in an automotive context, in which the fuel level inside a gas tank is detected, or in which the liquid level inside a windshield washer tank is detected. As another example, the detection may occur in a health care context, in which the level of the urine (e.g., of a bedridden patient) in a bed pan is detected.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for detecting a level, comprising: providing a container having a container electrode, at least a portion of the container electrode extending along a height dimension of the container; providing a substrate having an input electrode and a drive electrode; arranging the container and the substrate adjacent to each other to capacitively couple the container electrode to the input electrode or the drive electrode; and while the container electrode is capacitively coupled to the input electrode or the drive electrode, determining a level of a substance inside the container based on an effective capacitance between the input electrode and the drive electrode.

2. The method of claim 1, wherein the container electrode is located inside the container.

3. The method of claim 2, wherein the at least a portion of the container electrode extends along an interior surface of the container.

4. The method of claim 1, wherein the at least a portion of the container electrode extends along an exterior surface of the container.

5. The method of claim 1, wherein the at least a portion of the container electrode extends from a bottom of the container to at least near a top of the container.

6. The method of claim 1, wherein the container and the substrate are separated by a dielectric when the container and the substrate are arranged adjacent each other.

7. The method of claim 6, wherein the dielectric comprises a protective layer that covers the input electrode and the drive electrode, or the dielectric comprises air in a gap that separates the container and the substrate.

8. The method of claim 1, wherein arranging at the container and the substrate adjacent each other capacitively couples the container electrode to the input electrode.

9. The method of claim 1, wherein: the container further has a second container electrode, at least a portion of the second container electrode extending along the height dimension of the container; and arranging the container and the substrate adjacent each other capacitively couples the container electrode to the input electrode and capacitively couples the second container electrode to the drive electrode.

10. The method of claim 9, wherein: the at least a portion of the container electrode extends from a bottom of the container to at least near a top of the container; and the at least a portion of the second container electrode extends from the bottom of the container to at least near the top of the container.

11. The method of claim 1, wherein determining a level of the substance inside the container comprises sensing the effective capacitance between the input electrode and the drive electrode.

12. The method of claim 1, wherein the substance inside the container comprises a fluid, a gel, or a powder.

13. The method of claim 1, wherein the substrate comprises a printed circuit board (PCB), a metal plate, a carbon plate, or an indium tin oxide (ITO) plate.

14. A system for detecting a level, comprising a substrate having an input electrode and a drive electrode; a container having a container electrode, at least a portion of the container electrode extending along a height dimension of the container, wherein the container is arranged adjacent the substrate, such that the container electrode is capacitively coupled to the input electrode or the drive electrode; and a circuit that, while the container electrode is capacitively coupled to the input electrode or the drive electrode, determines a level of a substance inside the container based on an effective capacitance between the input electrode and the drive electrode.

15. The system of claim 14, wherein the container and the substrate are separated by a dielectric.

16. The system of claim 15, wherein the dielectric comprises a protective layer that covers the input electrode and the drive electrode, or the dielectric comprises air in a gap that separates the container and the substrate.

17. The system of claim 14, wherein the container is arranged adjacent the substrate, to capacitively couple the electrode to the input electrode.

18. The system of claim 14, wherein: the container further has a second container electrode, at least a portion of the second container electrode extending along the height dimension of the container; and the container is arranged adjacent the substrate, to capacitively couple the container electrode to the input electrode and capacitively couple the second container electrode to the drive electrode.

19. The system of claim 14, wherein the substance inside the container comprises a fluid, a gel, or a powder.

20. The system of claim 14, wherein the substrate comprises a printed circuit board (PCB), a metal plate, a carbon plate, or an indium tin oxide (ITO) plate.

* * * * *